United States Patent [19]

Benscoter

[11] Patent Number: 4,496,067
[45] Date of Patent: Jan. 29, 1985

[54] UNDERFLOOR JUNCTION BOX

[75] Inventor: Richard D. Benscoter, Vienna, W. Va.

[73] Assignee: Butler Manufacturing Company, Kansas City, Mo.

[21] Appl. No.: 594,215

[22] Filed: Mar. 28, 1984

[51] Int. Cl.³ .............................. H02Q 3/08
[52] U.S. Cl. .............................. 220/3.7; 220/3.3
[58] Field of Search .......................... 220/3.7, 3.3

[56] References Cited

U.S. PATENT DOCUMENTS

| | | | |
|---|---|---|---|
| 1,949,883 | 3/1934 | Sharp | 220/3.7 |
| 2,931,533 | 4/1960 | Wiesmann | 220/3.7 |
| 2,936,092 | 5/1960 | Johnson | 220/3.7 |
| 3,318,476 | 5/1967 | Clark | 220/3.7 X |
| 3,499,570 | 3/1970 | Butler | 220/3.3 |
| 3,784,042 | 1/1974 | Hadfield et al. | 220/3.3 |

Primary Examiner—Steven M. Pollard
Attorney, Agent, or Firm—Frederick J. Olsson

[57] ABSTRACT

A junction box having an access unit adapting the box for use in floors having carpet or tile as floor covering whose construction contemplates an adjusting ring having a flange which function both as a trim for carpet or tile on the cover and as trim for carpet or tile on the floor.

4 Claims, 5 Drawing Figures

UNDERFLOOR JUNCTION BOX

This invention in general relates to an improved junction box for electrical underfloor distribution systems and more specifically relates to an improved access unit for such junction boxes, the improved access unit being factory or field set up depending on whether the floor covering is tile or carpet.

One object of the invention is to promote the useful art of electrical underfloor distribution systems by an improved junction box which is assembled and shipped out by the manufacturer with the access unit arranged for use in floors having carpet as floor covering but which, by a very simple field modification, can be adapted for use in floors having tile as floor covering.

Another objective of the invention is to promote the useful art of electrical underfloor distribution systems by a junction box having an access unit adapting the box for use in floors having tile as floor covering whose construction contemplates an adjusting ring having a flange which functions both as a tile trim for tile on the cover and as a tile trim for tile on the floor and thereby eliminating the conventional cover-mounted tile pan but which construction also provides for the same adjusting ring to be used in floors having carpet as a floor convering.

Another objective of the invention is to promote the useful art of electrical underfloor distribution systems of the kind employed in a floor having tile as a floor covering and particularly where one or more junction boxes in the system has a cover which holds tile in a flanged tile holder pan and the pan, by the imposition of heavy loads and the like on the flange thereof, had become damaged and constitutes a tripping hazard, the invention accomplishes the above objective in providing a means for permanently eliminating the hazard by making the junction box panless, this being done through the medium of a retro fit kit including an adjusting ring having an especially designed filler flange which functions both as tile trim for the tile on the cover and the tile on the floor and thereby eliminates the need for a tile pan holder.

The invention will be described below in connection with the following drawings wherein.

The invention will be described herein in connection with a single level junction box. It will be understood, however, the invention finds utility in junction boxes of other configurations such as, for example, the dual-level box illustrated in U.S. Pat. No. 3,784,042 assigned to the assignee of this invention. Also, it will be understood that the term "title" as applied to floors includes linoleum.

Figure 1:
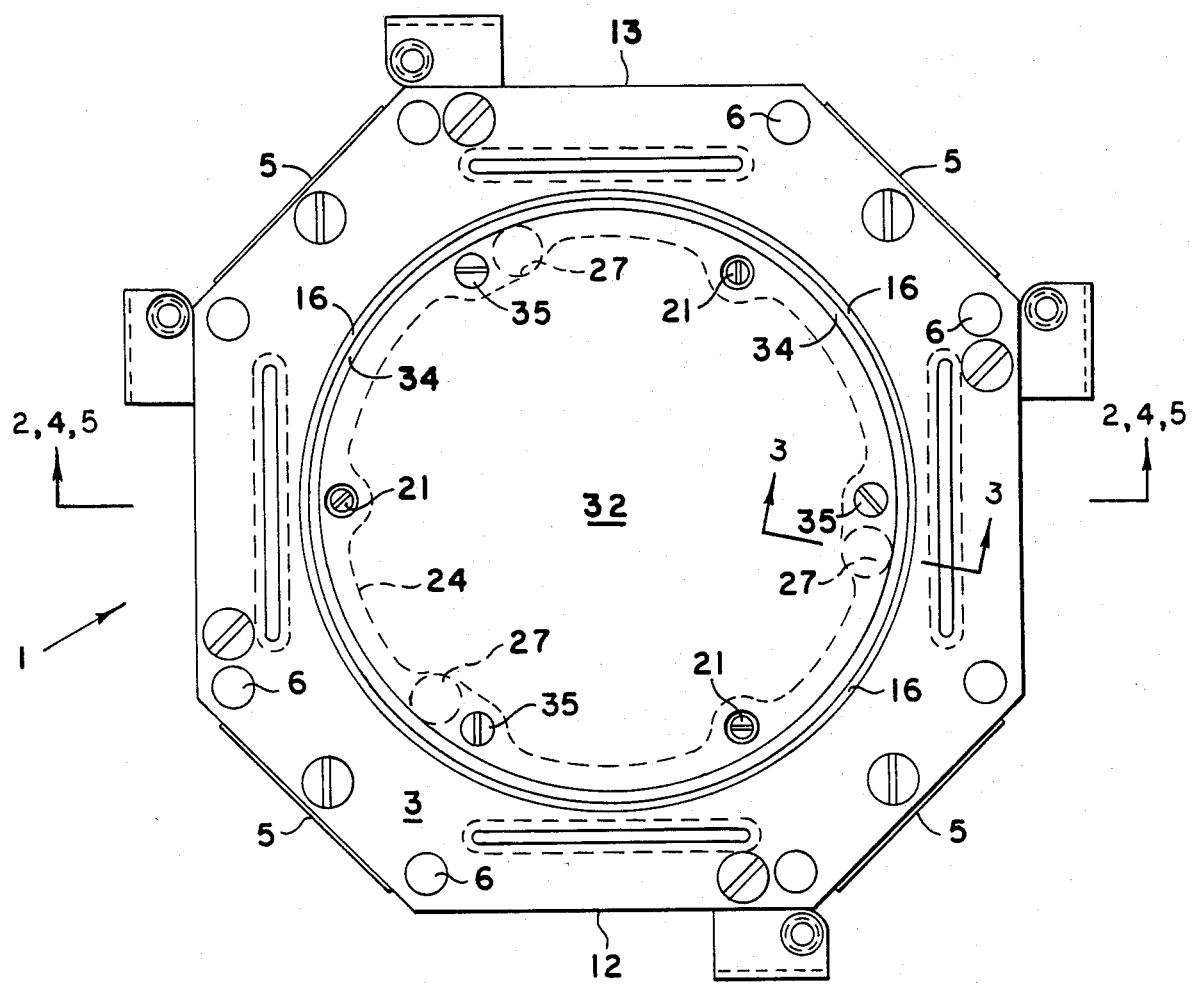
FIG. 1 is a plan view of a typical single-level junction incorporating the invention.

A junction box 1 has a hollow housing 2 comprised of section cover 3, base 4, and intermediate filler pieces 5 and all held together by rivets 6. The filler pieces are indicated only in FIG. 1.

The section cover 3 of the housing 2 has a top opening 7 (FIG. 2) which provides access to the interior of the housing. The section cover 3, the base 4, and the filler pieces 5 form a plurality of side openings two of which are noted at 10 and 11 in FIG. 2. These openings are for joining the junction box with underfloor ducts. Similar duct openings are provided at the sides 12 and 13. The filler pieces 5 are normally constructed to receive adaptors (not shown) for joining the junction box with conduit.

The normal orientation of the junction box as buried in a floor is with the section cover 3 and hence the top opening 7 extending generally horizontally.

The section cover 3 carries a plaster ring 14 which extends around the top opening 7 and is connected to the section cover by the lip 15. The plaster ring prevents entry of the concrete into the box during the pour. The top edge 16 of the plaster ring, when the junction box is installed in a floor, is adapted to be flush with the concrete floor surface, the latter being indicated by the heavy dot-dash lines 17.

The foregoing construction is typical and conventional. It is the construction of the access unit 20 which provides for the junction box to be shipped panless and for use either with a carpet or a tile-type floor. The access 20 will now be described.

A plurality of adjusting screws 21 are rotatably mounted on the housing inside of plaster ring 14. This is done by that the head 22 of the screw rests on the section cover 3 and is captured by the plaster ring 14 in a manner so that the screw can be rotated by a tool inserted in the end slot 23. The adjusting screws are equi-spaced around the periphery of the opening 7 and each screw extends vertically upwardly from the housing 2.

An adjusting ring 24 is disposed inside of the plaster ring 14 and is threadingly engaged with the adjusting screws 21. Rotation of the adjusting screws 21 causes the adjusting ring to move in a vertical direction. The adjusting ring has an upwardly extending, peripheral filler flange 25 which is located close to the plaster ring 14. The adjusting ring supports an annular gasket 26.

Figure 3:
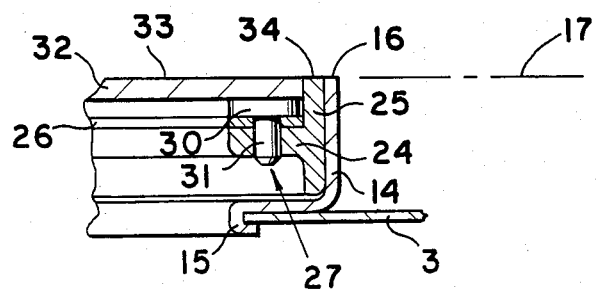
FIG. 3 is an enlarged fragmentary view taken along the lines 3—3 of FIG. 1.

The adjusting ring also carries a plurality of support buttons 27 (FIG. 1) which are equi-spaced around the top opening 7. The structure of and the manner in which the buttons 27 are supported on the adjusting ring is illustrated in FIG. 3. Each button has a disc-like head section 30 an a stem-like body section 31. The adjusting ring 24 an gasket 26 each are provided with appropriate apertures to receive the stems 31. The fit between a stem and the gasket and adjusting ring is snug but permits easy removal of a button by prying up the head.

A cover 32 is mounted on the support buttons 27 with the peripheral edge of the cover being closely adjacent the filler flange 25.

The thickness of the cover, the height of the filler flange 25, and the support position provided by the buttons 27 result in the top surface 33 of the cover and top edge 34 of the filler flange being substantially flush.

The cover 32 has appropriate openings for a tool to reach the slots 22 of the adjusting screws 21. Also, the cover has hold-down screws 35 which extend down through openings in the cover and gasket 26 and are threaded into the adjusting ring.

Figure 2:
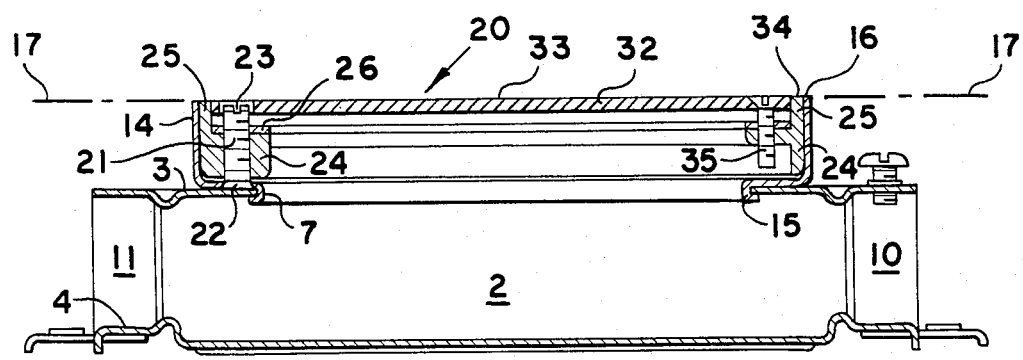
FIG. 2 is an elevational view taken along the lines 2—2 of FIG. 1 with the access unit being set up for carpet-type floor covering.

In the position of the components as noted in FIGS. 2 and 3, the adjusting screws 21 have been manipulated to bring the top surface 33 of the cover and the top edge 34 of the filler flange 26 substantially flush with the top edge 16 of the plaster ring 14.

The flush condition just described adapts the box for use with floors employing a carpet surface. Also, the junction box is shipped in the flush condition.

When the junction box is mounted in a floor and under specified or ideal condition, the top edge 16 of the plaster ring, the edge 34 of the filler flange, and top surface 32 are all flush with the floor surface 17 so that the installed carpet presents a smooth, non-raised surface.

The procedure for installing the carpet over the box is to cut a circular hole in the carpet approximately the same diameter as the cover. The cut-out section of carpet is then glued or taped to the cover surface 33 so that it can be peeled off to allow removal of the cover 32 when access to the inside of the box is desired.

The junction box as shipped can be quickly converted on the job site for use with floors having a tile surface. The manner in which this is done will be explained below particularly in connection with FIG. 5.

Figure 5:
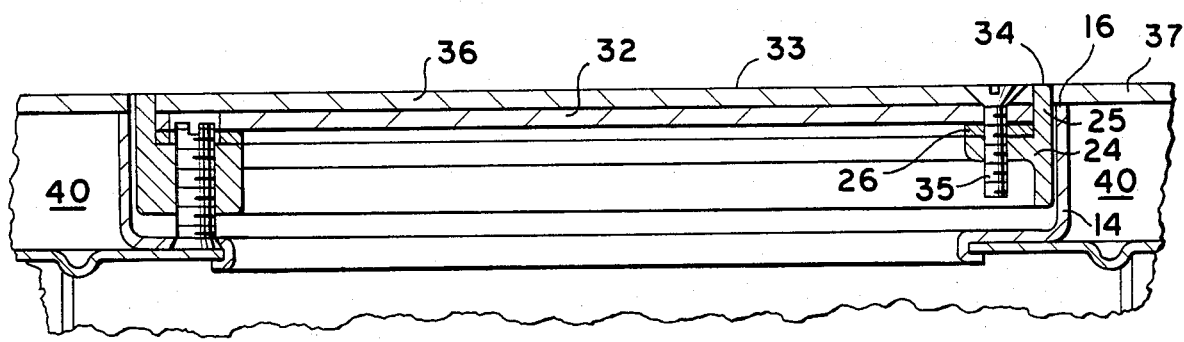
FIG. 5 is an enlarged fragmentary elevational view of the access usit of FIG. 2 arranged for tile-type floor covering.

The cover 32 and the buttons 27 are removed. Then the cover remounted by placing the same on the gasket 26 which acts to position the cover as shown in FIG. 5. The thickness of the gasket 26, the thickness of the cover 32, and the vertical height of the filler flange 25 provide that in the position of FIG. 5 the top surface 33 of the cover is below the top edge 34 of the filler flange by a distance equal to the thickness of the tile which is normally ⅛ inch. The adjusting screws are then manipulated to adjust the adjusting ring 24 upwardly so that the top edge 34 is above the top edge 16 of the plaster ring a distance equal to the thickness of the floor tile or ⅛ inch. A section of tile is cut to have the same diameter as the cover, holes for the hold-down screws 35 are cut out and then the tile section placed on the cover and secured by the screws 35. In FIG. 5, the tile section on the cover 32 is indicated at 36 and the tile of the floor at 37. Also in FIG. 5, the concrete is indicated at 40.

As will be evident from an inspection of FIG. 5, the top portion of the filler flange 25 functions as a tile trim for the tile section 36 on the cover 32 and the tile 37 on the floor.

Thus, the structure just described provides for the elimination of the conventional tile pans.

It is pointed out that while in the foregoing description, the access unit is shown as circular, it will be understood that the invention is clearly applicable for junction boxes having a square or rectangular access unit.

In addition to the features of carpet/tile adaptability and the elimination of the tile pans, the invention finds greats utility for correcting faults in existing installations employing pans which have been damaged. The condition referred to is illustrated in FIG. 4.

Figure 4:
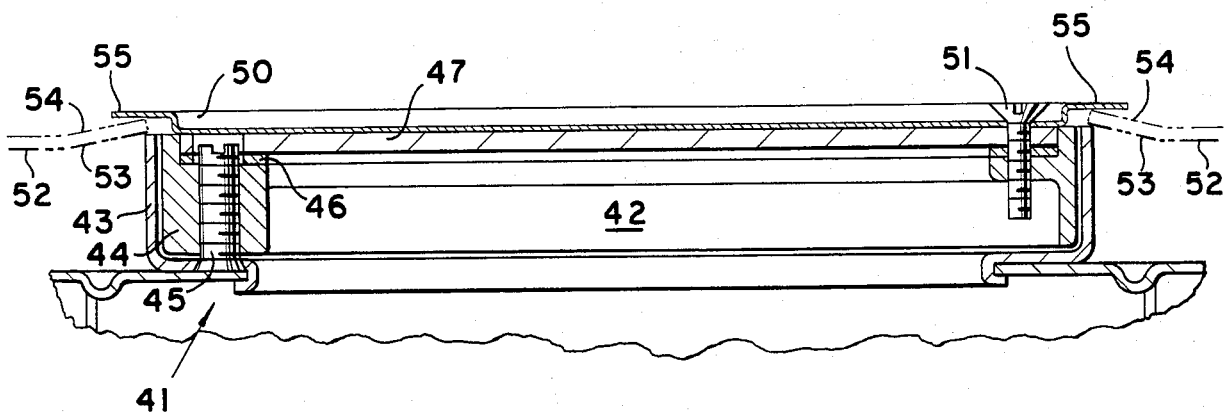
FIG. 4 is a fragmentary elevational view (similar to FIG. 2) illustrating a typical prior art pan-type junction box access unit.

In FIG. 4 a junction box 41 has an access unit 42. Inside of the plaster ring 43 is the adjusting ring 44 mounted on adjusting screws 45. The adjusting ring 44 has a gasket 46 mounting the cover 47. The cover 47 carries the pan 50 held in place by cover hold-down screws 51.

It sometimes happens that installing an underfloor system on a slab, the top edges of the plaster rings of one or more junction boxes are set up a distance from the slab surface which is slightly greater than the contemplated thickness of the finished floor. Other times, the finished floor is poured with a thickness just under the specified thickness. In either case, upon hardening of the pour, the top of the junction box is slightly above the floor surface. To compensate for this, so to speak, the contractor grouts a small amount of concrete around the top and tapers the grout away from the box. This condition is indicated in FIG. 4 (in a somewhat exaggerated representation just to illustrate the point). The top of the slab is indicated at 52 while the top of the taper section is indicated at 53.

It will be evident that when the tile 54 is installed the flange 55 of the pan will not be supported by the tile, and, being above the tile, the flange is a tripping hazard. Moreover, heavy loads such as dollies, lift trucks, heavy cabinets or furniture or the like can cause the flange 55 to be bent downwardly. This causes a distortion of the pan and the tripping hazard is magnified, and moreover, the pan becomes an eye-sore.

The above condition can be remedied by use of the invention as explained following.

First the pan and tile therein are removed. Then the adjusting ring and gasket are removed. Next an adjusting ring such as the ring 24 with a gasket such as 26 are installed on the adjusting screws. The adjusting ring is positioned on the screws so that the top edge of the filler flange is flush with the floor carpet surface. Next, the original cover is placed on the gasket. A new section of tile is cut (or the original section in the pan removed and trimmed) and then the section placed on the cover and held down by the hold-down screws.

It will be evident that the applied remedy, as described above, creates a condition the same as that shown in FIG. 5 with the exception of the outside taper of the floor tile. Thus, the tripping hazard is removed.

For purposes of correcting the condition as noted in connection with FIG. 4, the invention contemplates the supplying of a retro-fit kit which includes the adjusting ring such as ring 24 and a gasket such as gasket 26.

I claim:

1. An underfloor system junction box with a panless access system for use with both floor carpet and floor tile comprising:

hollow housing means having a top opening and a plurality of side openings, the top opening providing for hand access to the interior of the housing and the side openings providing means for securing underfloor ducts to the box and the housing being adapted to be mounted in the floor with said top opening extending generally horizontally;

an annular plaster ring secured to said housing and extending around the periphery of said top opening for use in preventing entry of concrete to the interior of the housing during the pour;

a plurality of adjusting screws disposed inside of said plaster ring and each rotatably mounted on said housing and spaced around the periphery of said top opening and extending upwardly from the housing;

an adjusting ring disposed inside of said plaster ring and mounted on said adjusting screws and having an upwardly extending filler flange disposed adjacent the interior of the plaster ring, rotation of said adjusting screws causing the ring to move in a vertical direction;

annular gasket means mounted on said adjusting ring;

a plurality of support buttons each having a head section and a body section, the body section removably mounting the button on said adjusting ring with its head section engaging said gasket;

a cover disposed inside of said adjusting ring filler flange and engaging the head sections of said buttons with the top surface of the cover substantially flush with the top edge of said filler flange;

hold-down screw means removably securing said cover to head sections;

a plurality of openings in said cover providing access to said adjusting screws, the screws being adjusted to cause the cover and the top edge of the filler flange to be substantially flush with the top edge of the plaster ring and in said substantially flush condition the cover, the top edge of the filler flange, and the top edge of the plaster ring being adapted for use with floors employing a carpet surface with carpet on the cover and on the floor adjacent thereto; and said components providing the option for said cover to be removed, said buttons to be removed, the cover replaced to engage said gasket means with the gasket means positioning the cover below the top edge of said filler flange a distance substantially equal to the thickness of the tile and then the adjusting ring adjusted upwardly so that the top portion of said filler flange is raised above the top edge of said plaster ring a distance substantially equal to the thickness of the tile and in said raised condition, the cover, the top section of the filler flange, and the top edge of the plaster ring being arranged for use in floors employing a tile surface wherein the top portion of the filler flange can function as a tile trim for tile on the cover and the floor adjacent thereto.

2. In a concrete floor having a floor tile covering and an underfloor electrical distribution system, an underfloor junction box having a panless access unit, the junction box comprising:

hollow housing means in said floor and having a top opening and a plurality of side openings, the top opening providing for hand access to the interior of the housing and the side openings providing means securing underfloor ducts to the box and the housing being mounted in the floor with said top opening extending generally horizontally;

an annular plaster ring secured to said housing and extending around the periphery of said top opening for use in preventing entry of concrete to the interior of the housing during the pour, the top edge of the plaster ring being substantially flush with the floor surface;

a plurality of adjusting screws disposed within said plaster ring and each rotatably mounted on said housing and spaced around the periphery of said top opening and extending upwardly from the housing;

an adjusting ring disposed inside said plaster ring and mounted on said adjusting screws and having an upwardly extending filler flange disposed adjacent the interior of the plaster ring, rotation of said adjusting screws causing the ring to move in a vertical direction;

annular gasket means mounted on said adjusting ring;

a cover disposed inside of said adjusting ring;

floor tile secured to said cover;

said cover being mounted on said gasket means with the gasket means positioning the cover below the top edge of said filler flange a distance substantially equal to the thickness of the floor tile on the cover so that the tile surface is substantially flush with the top edge of said filler flange, the top portion of the filler flange functioning as tile trim for the tile on the cover;

hold-down screw means removably securing said cover to said gasket means; and a plurality of openings in said cover providing access to said adjusting screws, the adjusting screws positioning the adjusting ring so that the top edge of said filler flange is raised above the top edge of said plaster ring a distance substantially equal to the thickness of the floor tile whereby the top edge of the filler flange is substantially flush with the tile surface on the floor, the top portion of the filler flange functioning as tile trim for the tile on the floor.

3. In a concrete floor having a floor tile covering and an underfloor electrical distribution system, an underfloor junction box having a panless access unit, the junction box comprising:

hollow housing means in said floor and having a top opening and a plurality of side openings, the top opening providing hand access to the interior of the housing and the side openings providing means securing underfloor ducts to the box and the housing being mounted in the floor with said top opening extending generally horizontally;

a plurality of adjusting screws each rotatably mounted on said housing and spaced around the periphery of said top opening and extending upwardly from the housing;

an adjusting ring mounted on said adjusting screws and having an upwardly extending filler flange, rotation of said adjusting screws causing the ring to move in a vertical direction;

annular gasket means mounted on said adjusting ring;

a cover disposed inside of said adjusting ring and floor tile secured to said cover;

said cover being mounted on said gasket means, the gasket means positioning the cover below the top edge of said filler flange a distance substantially equal to the thickness of the floor tile on the cover so that the tile surface is substantially flush with the top edge of said filler flange, the top portion of the filler flange functioning as a tile trim for the tile on the cover;

hold-down screw means removably securing said cover to said gasket means;

a plurality of openings in said cover providing access to said adjusting screws, the adjusting screws positioning the adjusting ring so that the top edge of the filler flange is substantially flush with the surface of the tile on the floor and the top position of said filler flange functioning as tile trim for the tile on the floor.

4. In a concrete floor having a floor tile covering, an underfloor electrical distribution system including underfloor junction box means having a housing which rotatably mounts adjusting screws supporting an adjusting ring, the ring having a gasket mounting a cover, and the cover mounting a tile holder pan, a kit for eliminating the tile holder pan comprising:

an adjusting ring having a filler flange;

annular gasket means on the adjusting ring; and the adjusting ring and annular gasket means forming an assembly which, with said adjusting ring and said gasket in said installed junction box removed, can be supported on said adjusting screws with said cover on the gasket means which positions the cover below the top edge of said filler flange a distance substantially equal to said floor tile so that the surface of the tile on the cover will be substantially flush with the top edge of the filler flange whereby the top portion of the filler flange functions as a tile trim for tile on the cover and the adjusting ring being positionable by the adjusting screws so that the top edge of the filler flange is substantially flush with the tile surface on the floor whereby the top portion of the filler flange functions as tile trim for the tile on the floor.

* * * * *